US012471616B2

(12) United States Patent
Le-Bail et al.

(10) Patent No.: US 12,471,616 B2
(45) Date of Patent: Nov. 18, 2025

(54) METHOD OF ADDITIVE MANUFACTURING BY HOT-EXTRUSION

(71) Applicants: INSTITUT NATIONAL DE RECHERCHE POUR L'AGRICULTURE, L'ALIMENTATION ET L'ENVIRONNEMENT, Paris (FR); ECOLE NATIONALE VÉTÉRINAIRE, AGROALIMENTAIRE ET DE L'ALIMENTATION, Nantes (FR)

(72) Inventors: Alain Le-Bail, Nantes (FR); Bianca Maniglia, Franca (BR); Patricia Le-Bail, Nantes (FR)

(73) Assignees: INSTITUT NATIONAL DE RECHERCHE POUR L'AGRICULTURE, L'ALIMENTATION ET L'ENVIRONNEMENT, Paris (FR); ECOLE NATIONALE VÉTÉRINAIRE, AGROALIMENTAIRE ET DE L'ALIMENTATION, Nantes (FR)

( * ) Notice: Subject to any disclaimer, the term of this patent is extended or adjusted under 35 U.S.C. 154(b) by 141 days.

(21) Appl. No.: 18/552,333

(22) PCT Filed: Mar. 25, 2022

(86) PCT No.: PCT/EP2022/058028
§ 371 (c)(1),
(2) Date: Sep. 25, 2023

(87) PCT Pub. No.: WO2022/200619
PCT Pub. Date: Sep. 29, 2022

(65) Prior Publication Data
US 2024/0196950 A1     Jun. 20, 2024

(30) Foreign Application Priority Data

Mar. 26, 2021 (EP) ..................... 21305381

(51) Int. Cl.
*B29C 64/118* (2017.01)
*A23L 5/10* (2016.01)
(Continued)

(52) U.S. Cl.
CPC .............. *A23P 20/20* (2016.08); *A23L 5/10* (2016.08); *A23P 30/20* (2016.08); *B33Y 10/00* (2014.12);
(Continued)

(58) Field of Classification Search
None
See application file for complete search history.

(56) References Cited

U.S. PATENT DOCUMENTS 11,383,439 B1 * 7/2022 Liu ................. B33Y 30/00
2015/0150288 A1   6/2015 Tutuncu et al.
(Continued)

FOREIGN PATENT DOCUMENTS

CN     110053254 A     7/2019
EP     0312363 A2      4/1989
(Continued)

OTHER PUBLICATIONS

International Search Report for PCT/EP2022/058028 mailed Jul. 11, 2022, 3 pages.
(Continued)

*Primary Examiner* — Yung-Sheng M Tsui
*Assistant Examiner* — Melody Tsui
(74) *Attorney, Agent, or Firm* — NIXON & VANDERHYE (57) ABSTRACT

Disclosed is a method of additive manufacturing by hot-extrusion, which method of additive manufacturing includes
(Continued)

the following successive steps: a providing step, wherein a printable composition is provided, the printable composition including an aqueous printing matrix, in which non-gelatinized starch granules are dispersed, wherein the non-gelatinized starch granules are in a non-gelled state and have a gelatinization temperature below 70° C.; and a printing step, wherein the printable composition is subjected to a heat treatment and is deposited layer by layer. During the printing step, the printable composition is subjected to a succession of two different heating temperatures: a storage heating temperature, lower than the gelatinization temperature, in order to heat the printable composition without gelatinizing the non-gelatinized starch granules, and a printing heating temperature, higher than the gelatinization temperature, in order to gelatinize the non-gelatinized starch granules in the layers.

17 Claims, 2 Drawing Sheets

(51) Int. Cl.
*A23P 20/20* (2016.01)
*A23P 30/20* (2016.01)
*B33Y 10/00* (2015.01)
*B33Y 30/00* (2015.01)
*B33Y 50/02* (2015.01)
*B33Y 70/00* (2020.01)
*A23P 20/25* (2016.01)

(52) U.S. Cl.
CPC ............... *B33Y 30/00* (2014.12); *B33Y 50/02* (2014.12); *B33Y 70/00* (2014.12); *A23P 2020/253* (2016.08)

(56) References Cited

U.S. PATENT DOCUMENTS

| | | | | |
|---|---|---|---|---|
| 2016/0318247 | A1* | 11/2016 | Schlachter | B29C 64/106 |
| 2018/0298215 | A1* | 10/2018 | Andersen | C04B 35/457 |
| 2018/0369451 | A1* | 12/2018 | Rapoport | C09D 11/38 |
| 2021/0169809 | A1* | 6/2021 | Albed Alhnan | A61K 9/0053 |
| 2023/0040818 | A1* | 2/2023 | Mirkin | B33Y 10/00 |

FOREIGN PATENT DOCUMENTS

| | | | | |
|---|---|---|---|---|
| KR | 20180037355 A | * | 4/2018 | B29C 64/00 |
| WO | WO-2017068177 A1 | * | 4/2017 | B29C 48/02 |

OTHER PUBLICATIONS

Written Opinion of the ISA for PCT/EP2022/058028 mailed Jul. 11, 2022, 6 pages.

* cited by examiner

METHOD OF ADDITIVE MANUFACTURING BY HOT-EXTRUSION

CROSS-REFERENCE TO RELATED APPLICATIONS

This application is the US national stage of PCT/EP2022/058028, filed Mar. 25, 2022 and designating the United States, which claims the priority of EP 21305381.2, filed Mar. 26, 2021. The entire contents of each foregoing application are incorporated herein by reference.

BACKGROUND OF THE INVENTION

Field of the Invention

The present invention relates to the technical field of additive manufacturing, and more precisely to methods of additive manufacturing by hot-extrusion.

Description of the Related Art

Additive manufacturing, also named three-dimensional (3D) printing, aims at building a three-dimensional object from a computer-aided design model.

In other words, 3D printing technology consists of a controlled robotic-process whereby a product is built up layer by layer from 3D computer design program CAD or by downloading 3D platforms from some online services.

In this technical field, extrusion-based 3D printing (also named additive manufacturing by extrusion) is considered the easiest to develop.

This technique mainly involves a cylinder (i.e., a syringe) that moves along a surface, extruding material through a nozzle. The consecutive deposition of layers is undertaken by directing the cylinder at pre-determined locations by the 3D model.

Such a syringe-based extrusion printer typically uses food pastes of high viscosity. The food ink is extruded through the die or printing head and is expected to have a viscosity/mechanical property allowing a vertical assembly (self-supporting slurry). The ink must also be suitable for extrusion and, when deposited on the surface, must have to maintain the ability of self-supporting.

In particular, the additive manufacturing by extrusion can consist in a "cold-extrusion" wherein the printing ink needs to have a viscosity low enough to be pushed through a printing die (which is usually of small diameter, e.g., 1-3 mm) but also firm enough to allow building object in the vertical direction by successive layers.

The additive manufacturing by extrusion can also consist of "hot-extrusion" whereof the principle is to melt a material travelling through a printing die (or printing nozzle) to have the material under gel state (melted but not liquid) when deposited. The material solidifies on the printing plateau afterward.

However, due to high viscosity, most of the printed compositions cannot easily circulate in conventional pumping systems used for 3D printer (typically of syringe type) through a narrow printing die.

Meanwhile, in case of low viscosity, the gel will not be firm enough to allow building objects in the vertical direction or the final printed project will have low mechanical resistance and a lack of smoothness (quality of the surface of the deposited ink) after the final return to ambient temperature.

To overcome these drawbacks, one solution is to use a printable composition comprising an aqueous printing matrix, in which non-gelatinized starch granules are dispersed.

Indeed, the non-gelatinized starch granules undergo heating and gelatinization only at the printing step. After deposit as a layer, the printable composition undergoes solidification thanks to natural cooling (advantageously in the ambience of the printer).

However, the technology of hot-extrusion is exposed to limitation in mass flow rate and then in printing speed in the case of conventional starch based printing ink.

Indeed, a long residence time in the nozzle is necessary to reach a full gelatinization of the ink containing non-gelatinized starch granules.

Consequently, any solution that may enhance the gelling properties and/or the kinetics of gelatinization of the said starch used in such printing ink, in order to enhance the printing speed, would be of great interest.

SUMMARY OF THE INVENTION

In order to overcome this drawback of the state of the art, the present invention provides a new method of additive manufacturing by hot-extrusion.

More particularly, the invention relates to a method of additive manufacturing by hot-extrusion, wherein said method of additive manufacturing comprises the following successive steps:
- a providing step, wherein a printable composition is provided,
- said printable composition comprising an aqueous printing matrix, in which non-gelatinized starch granules are dispersed,
- wherein said non-gelatinized starch granules have a gelatinization temperature, preferably below 70° C.,
- a printing step, wherein said printable composition is subjected to heat treatment and is deposited layer by layer.

According to the present invention, during said printing step, said printable composition is subjected to a succession of two different heating temperatures:
- a storage heating temperature, lower than said gelatinization temperature, preferably ranging from 20° C. to 10° C. below said gelatinization temperature, in order to heat said printable composition without gelatinizing said non-gelatinized starch granules, and
- a printing heating temperature, higher than said gelatinization temperature, preferably ranging from 20° C. to 50° C. above said gelatinization temperature, in order to gelatinize said non-gelatinized starch granules in said layers.

The present invention thus uses a transformation of the printable composition over the time to allow printing and to obtain the printed object.

In particular, the storage heating temperature (intended to heat said printable composition without gelatinizing said non-gelatinized starch granules) aims mainly at improving the printing speed by reducing the residence time in a nozzle. This technology is also interesting since it allows to reduce the viscosity of the aqueous printing matrix and thus increase the ability to be extruded.

Indeed, the non-gelatinized starch granules are pre-heated and undergo gelatinization only at the printing step.

The biopolymers contained in the non-gelatinized starch granules are dispersed in the printable composition; the dispersion is advantageously improved thanks to the shearing exerted in the narrow passage of a printing die.

After deposit, the printable composition undergoes solidification thanks to natural cooling (advantageously in the ambience of the printer).

In a preferred embodiment, during a natural cooling, the biopolymers (advantageously amylopectin and amylose) that have been dispersed from the starch granules embedded in the printable composition undergo retrogradation (amylopectin recrystallization) and crystallization (for amylose) resulting in the increase in firmness of the printable composition.

As a result, a firm gel will be obtained when deposited layer by layer, allowing the construction of printed objects with a better quality and more ability to develop vertical objects than conventional cold extrusion printing.

In other words, an advantage of the present method is to obtain a printable composition that can be circulated in conventional pumping systems used for 3D printer (syringe) through a narrow printing die. Meanwhile the final printed project will have much higher mechanical resistance and smoothness (quality of the surface of the deposited ink) after final return to ambient temperature.

The non-gelatinized starch granules thus gelatinize during the process due to the printing heating temperature and act as additive to improve the texture of the printed object.

Other non-limiting and advantageous characteristics of the process according to the invention, taken individually or in any technically possible combination, are as follows:
- said method is implemented with an additive manufacturing device, which additive manufacturing device comprises a storage enclosure, intended to contain said printable composition, a nozzle, and heating means, wherein said storage enclosure and said nozzle comprise separate heating means, and said additive manufacturing device further comprises control means designed to control said heating means at different temperatures, with a temperature setpoint of said nozzle according to said printing heating temperature which is greater than a temperature setpoint of the storage enclosure according to said storage heating temperature;
- said non-gelatinized starch granules consist in non-gelatinized modified starch granules, obtained by modification of native starch granules, wherein the gelation capacity of said non-gelatinized modified starch granules is higher than the gelation capacity of said native starch granules; said gelation capacity consists advantageously in the potential of a hydrocolloid issued from said non-gelatinized starch granules to organize themselves to form a three-dimensional structure, resulting in a stronger hydrogel, wherein said gelation capacity consists preferably in gel firmness capacity, and wherein said gel firmness capacity of said non-gelatinized modified starch granules is at least 4 times higher than the gel firmness capacity of said native starch granules;
- the non-gelatinized starch granules are chosen from the starch granules obtained from cassava, preferably from non-gelatinized modified cassava starch granules whereof the gelation capacity is higher than the gelation capacity of native cassava starch granules;
- the non-gelatinized modified starch granules consist of non-gelatinized native starch granules modified by a dry heating treatment (DHT) or by an ozone oxidation treatment;
- the printable composition comprises from 1 to 10% by weight of non-gelatinized starch granules;
- the aqueous printing matrix is chosen from hydrogels, advantageously from starch hydrogels, advantageously from thermoreversible hydrogels;
- the providing step comprises steps of manufacturing the printable composition, with a manufacturing step, wherein said aqueous printing matrix is manufactured, and a dispersing step, wherein said non-gelatinized starch granules are dispersed within said aqueous printing matrix.

The present invention also relates to a printable composition for a method of additive manufacturing according to the invention, comprising:
- an aqueous printing matrix, and
- non-gelatinized starch granules, dispersed or intended to be dispersed in said aqueous printing matrix,
- wherein said non-gelatinized starch granules consist in non-gelatinized modified starch granules, obtained by modification of native starch granules,
- wherein the gelation capacity of said non-gelatinized modified starch granules is higher than the gelation capacity of said native starch granules.

The invention also relates to a use of a printable composition in a method of additive manufacturing by hot-extrusion,
- wherein said printable composition comprising an aqueous printing matrix in which non-gelatinized starch granules are dispersed,
- wherein said non-gelatinized starch granules consist in non-gelatinized modified starch granules, obtained by modification of native starch granules,
- wherein the gelation capacity of said non-gelatinized modified starch granules is higher than the gelation capacity of said native starch granules.

Moreover, the invention relates to an additive manufacturing device, for a method of additive manufacturing according to the invention,
which additive manufacturing device comprises:
- a storage enclosure, intended to contain said printable composition,
- a nozzle, and
- heating means,
- wherein said storage enclosure and said nozzle comprise separate heating means,
- and in that said additive manufacturing device further comprises control means designed to control said heating means at different temperatures, with a temperature setpoint of said nozzle which is greater than a temperature setpoint of the storage enclosure.

The length of said storage enclosure is advantageously from to 1 to 3, preferably from 2 to 3, and preferably from 2.2 to 2.5, times longer than said nozzle, advantageously irrespective of the diameter of said storage enclosure and of said nozzle.

The additive manufacturing device also comprises preferably:
- a pressure sensor installed in the storage enclosure, and/or
- optical capture means, to measure a die-swell phenomena and to control it by action on the volume flow rate of the additive manufacturing device.

Of course, the different characteristics, variants and embodiments of the invention can be associated with each other in various combinations as long as they are not incompatible or mutually exclusive.

BRIEF DESCRIPTION OF THE DRAWINGS

In addition, various other characteristics of the invention emerge from the attached description given with reference to the drawings which illustrate non-limiting embodiments of the invention and in which.

DETAILED DESCRIPTION

It should be noted that, in these figures, the structural and/or functional elements common to the different embodiments may have the same references.

The present invention thus relates to the technical field of additive manufacturing by hot-extrusion of a printable composition.

Additive manufacturing, also named three-dimensional (3D) printing, relates to the construction of a three-dimensional object from a Computer-aided design (CAD) model or a digital 3D model.

Figure 2:
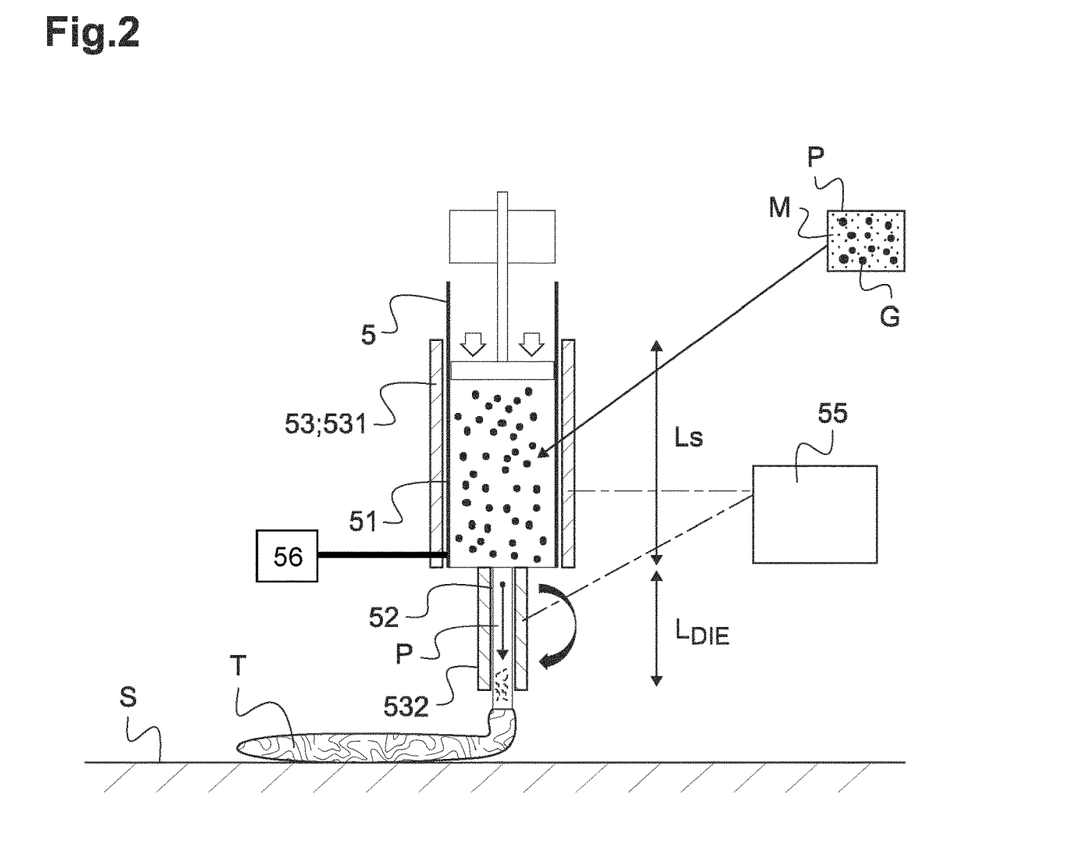
FIG. 2 is a schematic representation of an additive manufacturing device for implementing the method of additive manufacturing according to the invention.

By "additive manufacturing by hot-extrusion", it is advantageously enclosed extrusion-based additive manufacturing wherein a cylinder (or a syringe) moves along a surface, extruding heated material through a nozzle (as shown schematically in FIG. 2). The consecutive deposition of layers is undertaken by directing the cylinder at pre-determined locations by the 3D model.

The present invention is particularly suitable for a syringe-based extrusion printer, as specified thereafter.

And still in the present invention, the printable composition, also named "printing ink", consists advantageously in a food printable composition (3D food printing technology).

In particular, the present invention relates to a method of additive manufacturing comprises the following successive steps:
- a providing step, wherein a printable composition is provided,
- a printing step, wherein said printable composition is subjected to heat treatment and is deposited layer by layer.

Printable Composition

According to the present invention, in the providing step, the printable composition comprising an aqueous printing matrix wherein non-gelatinized starch granules are dispersed.

Such a printable composition thus consists advantageously in a dispersion or a suspension of non-gelatinized starch granules into an aqueous printing matrix.

The printable composition comprises advantageously from 1 to 10%, preferably 3 to 7%, by weight (w/w), of non-gelatinized starch granules.

Aqueous Printing Matrix

The aqueous printing matrix is advantageously chosen from printable material, also suitable for dispersion of non-gelatinized starch granules.

The aqueous printing matrix is advantageously chosen from hydrogels, advantageously from thermoreversible hydrogels.

By "hydrogels", it is advantageously enclosed physical or chemical cross-linked macromolecules forming a three-dimensional network capable of retaining water without disintegrating.

Thermoreversible hydrogels relate advantageously to hydrogels which can be softened by heat treatment of the printing step, but which regains their hydrogel characteristics when cooling.

Such thermoreversible hydrogels are interesting in maintaining effectively the non-gelatinized starch granules in a dispersed state before printing while participating to mechanical resistance and smoothness of the printed object after return to ambient temperature.

For example, the hydrogels show advantageously viscosity suitable to be processed by 3D printing—extrusion. Hydrogels have a good self-supporting structure, as they can have adequate flow tension and a storage module (G') larger than the loss module (G"). Hydrogels can reach the ideal viscosities to guarantee a good 3D impression by extrusion (from 30 mPa/s to $6 \times 10^7$ mPa/s, as disclosed in Jones, N., 2012, "Science in three dimensions: the print revolution", Nature, 487, 22-23.2012).

In the present invention, hydrogels enclose advantageously starch hydrogels (also named "starch-based hydrogels" or "starchy gel").

The formation of such starch-based hydrogels involves first starch gelatinization of non-gelatinized starch granules and then retrogradation to form a three-dimensional network.

Starch gelatinization is a process of breaking down the intermolecular bonds of starch molecules advantageously in the presence of water and heat, allowing the hydrogen bonding sites (the hydroxyl hydrogen and oxygen) to engage more water. This irreversibly dissolves the starch granule in water.

In the present invention, non-gelatinized starch granules are advantageously chosen from starch granules issued from cassava, maize, rice, potato or wheat.

In a preferred embodiment, starch hydrogels are obtained by gelatinization of non-gelatinized starch granules which consist of:
- native non-gelatinized starch granules, or
- non-gelatinized modified (or pretreated) starch granules, obtained by modification (or pretreatment) of native starch granules.

In the present context, the term "native", also named "raw", indicates that the starch granules are substantially in the form in which they are present in the fresh plant material and that they have not, to any substantial extent, been chemically or enzymatically modified.

And the terms "modified" or "pretreated" indicate that the starch is still in granule form, but it has been modified in its functional and structural properties.

For example, as specified here below, the non-gelatinized modified starch granules consist of non-gelatinized native starch granules modified by a dry heating treatment (DHT) or by an ozone oxidation treatment.

For example, said starch hydrogels consist advantageously in a suspension of 5 to 15% gelled starch (by weight, w/w).

In an alternative embodiment, the hydrogels are chosen from hydrocolloids such as galactomannan (konjac), proteins gel, chitosan, carrageenan and carboxymethyl cellulose.

In the present invention, the water content of the printable composition is advantageously above 50%, preferably from 50% to 80%, to ensure a full gelatinization of the starch contained in the composition. The amount of water allows controlling the final stiffness of the obtained gel.

Non-Gelatinized Starch Granules

According to the invention, non-gelatinized starch granules are dispersed in said aqueous printing matrix.

Generally, starch is the polysaccharide made up of glucose units linked together to form long chains. The number of glucose molecules joined in a single starch molecule varies from five hundred to several hundred thousand, depending on the type of starch. Starch is the storage form of energy for plants.

In general, "starch granules" relate advantageously to starch molecules produced by plants and oriented to the amyloplasts, where they are deposited to form granules. Both in plants and in the extracted concentrate, starch exists as granules varying in diameter from 2 to 130 microns. The size and shape of the granule are characteristic of the plant from which it came.

Starch granules are composed principally of amylopectin (major fraction) and amylose (minor fraction). Their structure is assumed to consist of concentric shells of alternating hard, semicrystalline, and soft amorphous layers.

The structure of the starch granule is crystalline with the starch molecules orienting in such a way as to form radially oriented crystals. This crystalline arrangement gives rise to a phenomenon of birefringence.

According to the invention, the non-gelatinized starch granules, dispersed in said aqueous printing matrix, are in a non-gelled (or ungelatinized or non-gelatinized) state.

By "non-gelatinized", "non-gelled state" or "ungelatinized state", it is advantageously enclosed starch molecules in granule form (having bi-refringence property), which have still the property to form a gel.

Moreover, said non-gelatinized starch granules, dispersed in said aqueous printing matrix, have preferably a gelatinization temperature below 70° C. (and preferably equal to or above 60° C.).

Gelatinization temperature consists of the temperature at which starch molecules lose their structure (including its birefringence), and leach out from the granules as swollen amylose.

In other words, non-gelatinized starch granules remain in granule form when the printable composition is maintained at a temperature below said gelatinization temperature (e.g., said storage heating temperature). In addition, non-gelatinized starch granules gelatinize when printable composition is subjected to a heat treatment whereof temperature is equal or above said gelatinization temperature (e.g., said printing heating temperature).

In the present invention, non-gelatinized starch granules are preferably chosen from starch granules issued from cassava, maize, rice, potato, or wheat.

In a preferred embodiment, the non-gelatinized starch granules consist of non-gelatinized modified (or pretreated) starch granules, obtained by modification (or pretreatment) of native starch granules.

The gelation capacity of the non-gelatinized modified starch granules is advantageously higher than the said non-gelatinized native starch granules, resulting in printed-samples with a good self-supporting structure.

The gelation capacity relates advantageously to the potential of hydrocolloids, issued from said non-gelatinized starch granules, to organize themselves to form a three-dimensional structure, resulting in stronger hydrogel.

The gelation capacity consists preferably in gel firmness capacity. Preferably, gel firmness capacity of non-gelatinized modified starch granules is at least 4 times higher than the gel firmness capacity of the non-gelatinized native starch granules.

The gelation capacity of the starch gels can also be defined by the rheological parameter tan δ.

The parameter tan δ corresponds to the ratio between the storage modulus $G'$ (measure of the energy stored and subsequently released per cycle of deformation and per unit of volume, i.e., the elastic response) and the loss modulus $G''$ (measure of the energy dissipated as heat per cycle of deformation, i.e., the viscous' response).

Starches with superior gelation capacity show gels with lower tan δ value ($G'>G''$), which means that the gel network is more solid-like than viscous-like (Chen et al., 2014, "Pasting and rheological properties of rice starch as affected by pullulan", International journal of biological macromolecules, 66, 325-331.2014).

Moreover, starches with higher gelation capacity (lower tan δ value) imply an increase in the gel firmness (this parameter can be determined by a puncture assay using a texture analyzer). The gel firmness corresponds to the energy required to penetrate the material (calculated by the area below the curve force versus the distance of penetration).

Moreover, the pre-treatment enhances advantageously the gelling properties and the kinetics of gelatinization of the said starch used in such printing ink.

In the present context, the term "native", also named "raw", indicates that the starch granules are substantially in the form in which they are present in the fresh plant material and that they have not, to any substantial extent, been chemically or enzymatically modified.

And the terms "modified" or "pretreated" indicate that the starch is still in granule form, but it has been modified to higher its gelation capacity.

For example, the non-gelatinized modified starch granules consist of non-gelatinized native starch granules modified by a dry heating treatment (DHT) or by an ozone oxidation treatment.

Non-gelatinized modified starch granules, resulting from non-gelatinized native starch granules modified by an ozone oxidation treatment, are also named "non-gelatinized ozonated starch granules".

Such non-gelatinized ozonated starch granules are advantageously obtained by non-gelatinized native starch pretreated by ozone in humid conditions, preferably for at least 30 min.

Such non-gelatinized modified starch granules, and the ozone processing, are disclosed for example in Maniglia et al. (International Journal of Biological Macromolecules 138 (2019) 1087-1097).

Ozone processing can promote starch modification through the cleavage of the glycosidic bonds of both amylose and amylopectin molecules (by decreasing their sizes and distribution), and it also leads to the replacement of hydroxyl groups by carbonyl and carboxyl groups (by changing their charges and chemical affinity), mainly in the amorphous regions of the granules. This process can be used safely in both gaseous and aqueous forms.

In brief, ozone processing can be carried out in a reactor with starch suspended in distilled water under constant stirring. Ozone-rich gas current is directed to a cylindrical glass reactor via a glass tube ending in a porous gas disperser. The gas flow in the reactor is maintained constant and the ozone concentration in the gas current is kept constant (advantageously for at least 30 min). After the ozone treatment, the reactor is supplied with oxygen only, in order to eliminate the residual ozone.

Non-gelatinized modified starch granules, resulting from non-gelatinized native starch granules modified by a dry heating treatment (DHT), are also named "non-gelatinized DHT starch granules".

Such non-gelatinized DHT starch granules are advantageously obtained from native starch pretreated by dry thermal treatment at a temperature above 100° C. (from 100° C. to 150° C.).

Such non-gelatinized modified starch granules, and the DHT processing, are disclosed for example in Maniglia et al. (Food Research International 128 (2020) 108803).

Dry heating treatment (DHT) involves a simple physical technique to modify the structural and physicochemical properties of starch. DHT consists of heating samples at temperatures between 110° C. and 150° C. for 1 to 4 h, keeping the starch moisture level low (<10% w/w).

The advantage of this treatment is that it is simple and safe (no chemical reagents are used). It does not generate effluents to be treated and the products obtained do not present traces of chemical components.

Generally, modification (or pretreatment) of non-gelatinized native starch granules aims at making faster gelatinization with an enhanced swelling of the starch granules and a better dispersion of the starch biopolymers. Consequently, the quality of the printing composition in terms of homogeneity, smoothness and texture quality, is improved thanks to these pretreatments. These pretreatments also allow a slight change in the gelatinization temperature, which is generally slightly increased in the range of a few Celsius degrees (1-2). In some other case with different starch or thermal treatment, it may be unchanged or slightly decreased. This is an advantage regarding the heat transfer which occurs in an additive manufacturing device. Indeed, the surface temperature of the additive manufacturing device should stay below a temperature for which the printable composition may be exposed to, to prevent water vaporization (e.g., boiling temperature, around 100° C.). Typical temperature of the additive manufacturing device is in the range of 90° C. to 110° C. for example; an important point is advantageous to ascertain that the printable composition does not exceed the boiling temperature of about 100° C. to avoid disruption of the printable composition.

In practice, the printable composition comprises at least one type of non-gelatinized starch granules.

More precisely, the printable composition comprises:
one type of non-gelatinized starch granules, or
a combination of at least two types of non-gelatinized starch granules (blends of non-gelatinized starch granules), e.g., issued from different plants.

In a preferred embodiment, the non-gelatinized starch granules are chosen among the starch granules obtained from cassava, preferably from non-gelatinized modified cassava starch granules whereof the gelation capacity is higher than the gelation capacity of the native cassava starch granules.

Cassava (*Manihot esculenta* Crantz), also called tapioca, *yucca* or manioc, is a perennial shrub. Cassava starch, the most essential component of cassava, is commonly used as a thickener and stabilizer in food processing to improve the convenience of the process and quality of final products. It is also used as an additive in the textile and papermaking industries Another advantage of exploiting cassava as a resource is to greatly increase the choice and diversity of staple foods for a large population, especially as a gluten-free food for people with celiac disease.

For example, the non-gelatinized modified cassava starch granules are as disclosed in Maniglia et al., International Journal of Biological Macromolecules 138 (2019) 1087-1097, or Maniglia et al., Food Research International 128 (2020) 108803.

Thus, generally, the printable composition according to the invention comprises:
an aqueous printing matrix, and
non-gelatinized starch granules, dispersed or intended to be dispersed in said aqueous printing matrix, wherein said non-gelatinized starch granules are in a non-gelled state and have a gelatinization temperature below 70° C.

Manufacturing the Printable Composition

Figure 1:
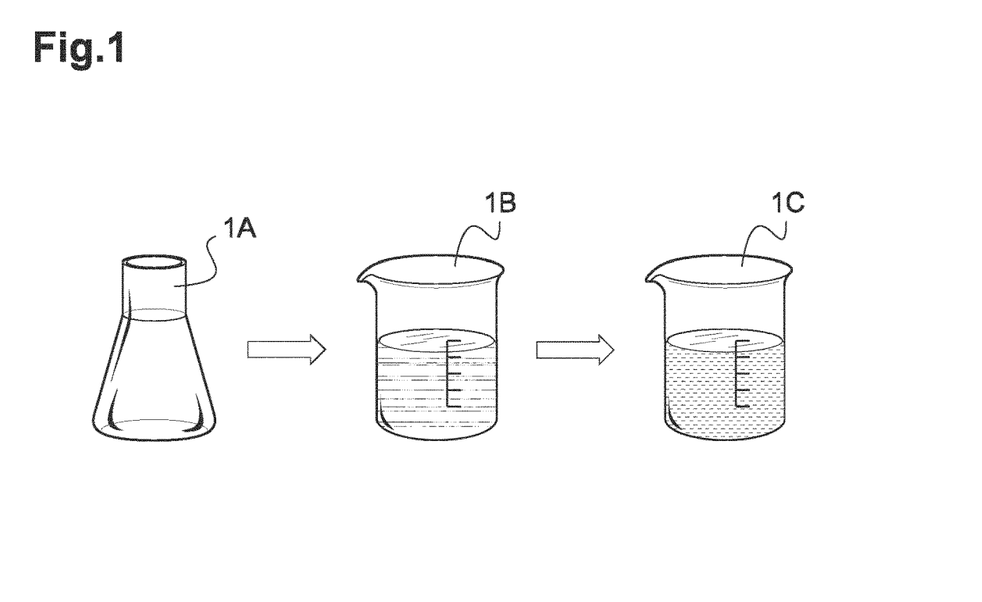
FIG. 1 is a schematic representation of the production of the printable composition.

In a preferred embodiment, as shown in FIG. 1, the providing step comprises steps of manufacturing the printable composition, with:
a manufacturing step (items 1A and 1B), wherein the aqueous printing matrix is manufactured, and then
a dispersing step (item 1C), wherein the non-gelatinized starch granules are dispersed within said aqueous printing matrix, advantageously by stirring and at a temperature lower than the gelatinization temperature.

For example, the printable composition is obtained through the following process:
preparation of a starchy suspension (item 1A), e.g., 10% w/w, e.g., non-gelatinized starch granules dispersed into water, then
heating of said starchy suspension (item 1B), e.g., 75 to 85° C. for 15 to 25 min, to obtain the aqueous printing matrix formed by thermoreversible hydrogels (precooked starch suspension), then
addition of starch granules non-gelatinized and mixing, at room temperature, to obtain said printable composition (item 1C).

In a variant, the aqueous printing matrix is obtained from pregelatinized starch powder (pregel).

Printing Step

The printing step is implemented according to additive manufacturing by hot-extrusion technique, wherein said printable composition is subjected to heat treatment and is deposited layer by layer.

This printing step encloses advantageously additive manufacturing, also named three-dimensional (3D) printing, wherein a three-dimensional object, named also printed object, is constructed from a Computer-aided design (CAD) model or a digital 3D model.

Then, to implement said printing step, the printable composition is adjusted to a heating temperature which is higher than the gelatinization temperature of non-gelatinized starch granules dispersed, in order to gelatinize said non-gelatinized starch granules (advantageously totally gelatinize, to obtain a total gelatinization) in successive layers.

According to the invention, during the printing step, the printable composition is subjected to a succession (or sequence) of two different temperatures:
a storage temperature, lower than said gelatinization temperature, preferably ranging from 20° C. to 10° C. below said gelatinization temperature, and
a printing temperature, higher than said gelatinization temperature, preferably ranging from 20° C. to 50° C. above said gelatinization temperature.

Thus, in the first stage, the storage temperature aims at preheating the printable composition to a temperature below the gelatinization temperature of the dispersed non-gelatinized starch granules, while at maintaining the dispersed non-gelatinized starch granules in said granule form.

In practice, all the printable composition, or a part of the printable composition, is preheated and maintained at said storage temperature.

Then, during deposit as such, the printable composition (advantageously a part of the printable composition) is submitted to a higher temperature, so called printing temperature, which is above the gelatinization temperature of the dispersed non-gelatinized starch granules, in order to gelatinize said non-gelatinized starch granules in said layers.

In other words, over the time, a part (or a volume) of the printable composition is continuously subjected to the printing temperature, higher than said gelatinization temperature, to gelatinize said non-gelatinized starch granules in said layers.

For example, non-gelatinized modified cassava starch granules have a gelatinization temperature of 69° C. And the storage temperature is preferably ranging from 5 to 10° C. below said gelatinization temperature; the printing temperature is preferably ranging from 20 to 30° C. above said gelatinization temperature.

According to FIG. 2, the printing step is advantageously implemented through an additive manufacturing device of the syringe type.

The additive manufacturing device 5, as shown on said FIG. 2, comprises:
- a storage enclosure 51, e.g., a cylinder or a piston, intended to contain the printable composition P (aqueous printing matrix M wherein non-gelatinized starch granules G are dispersed),
- a nozzle 52, also named "printing die", wherein the printable composition P circulates and is pushed across it from the storage enclosure 51 to a surface S, and
- heating means 53, intended to heat the printable composition P at specific temperatures within the storage enclosure 51 and the nozzle 52.

In particular, the nozzle has for example:
- an inner diameter from 0.5 to 2.5 mm, preferably from 1 to 2 mm, or possibly from 0.5 to 1.5 mm, and
- a length from 0.5 to 3.5 cm, preferably from 1 to 2 cm, or possibly from 1.5 to 3.5 cm.

And the storage enclosure 51 has for example:
- an inner diameter from 25 to 35 mm, and
- a length from 2 to 12 cm, preferably from 2 to 3 cm.

The length LS of said storage enclosure 51 (in particular its maximal useful capacity) is advantageously from 1 to 3, preferably from 1 to 1.5, or possibly from 2 to 3, and preferably from 2.2 to 2.5, times longer than said nozzle 52, LDIE, advantageously irrespective of the diameter of said storage enclosure 51 and of said nozzle 52.

Such a length ratio is interesting since it allows the printable composition to be heated until an uniform temperature is reached in the storage enclosure 51, before being transferred to the nozzle 52 in which the starch granules undergo gelatinization throughout the extrusion process.

Said length ratio is for example interesting when the printing nozzle is 1.5 to 2 mm diameter and the storage enclosure is 3 cm diameter.

More generally, it is advantageous that the printable composition reaches the set point temperature at the end of the storage enclosure 51, when the composition enters in the nozzle 52.

Preferably, the ratio of the residence time of the composition in the nozzle 52 and in the storage enclosure 51 is proportional to the diameter of the nozzle 52 to the square divided by the diameter of the storage enclosure 51 to the square.

Moreover, the characteristic heating time of the printable composition in which no convection occurs (rheology of a gel) is different in the nozzle 52 and in the storage enclosure 51. The theory of heat transfer allows saying that, similar to the residence time, the ratio of the characteristic heating time of the composition in the nozzle 52 and in the storage enclosure 51 is proportional to the diameter of the nozzle 52 to the square divided by the diameter of the storage enclosure 51 to the square. Therefore, in principle, the fact that the length of said storage enclosure 51 is advantageously from to 2 to 3, and preferably from 2.2 to 2.5, times longer than said nozzle 52 is in principle not dependent on the diameter of the storage enclosure 51 and on the diameter of the nozzle 52.

Moreover, independently or in combination, the inner diameter of said storage enclosure 51 (in particular its maximal useful capacity) is advantageously from 10 to 20, preferably from 13 to 17, times higher than said nozzle 52.

The storage enclosure 51 and the nozzle 52 comprise herein separate/distinct heating means 53, e.g.:
- first heating means 531, intended to heat the printable composition P at specific temperatures within the storage enclosure 51, e.g., said storage heating temperature, and
- second heating means 532, intended to heat the printable composition P at specific temperatures within the nozzle 52, e.g., said printing heating temperature.

These heating means 53 consist advantageously in a heating at the wall, having respective reference numbers 531, 532 in FIG. 2.

The present additive manufacturing device 5 further comprises control means 55, also named "temperature regulation", designed to control said heating means 531, 532 at different temperatures (temperature setpoints).

Indeed, the temperature setpoint of nozzle 52 is greater than the temperature setpoint of storage enclosure 51.

In particular, the temperature setpoint of nozzle 52 is set to obtain the printing temperature (above gelatinization temperature); and the temperature setpoint of the storage enclosure 51 is set to obtain storage temperature (below gelatinization temperature).

Thus, the storage enclosure 51 and the nozzle 52 are set with two different temperatures, one below gelatinization temperature and one above the gelatinization temperature (at the printing die).

The "residence time" in the storage enclosure 51 and the nozzle 52, respectively, is adjusted notably according to their respective volumes and the product flow rate.

Anyway, it is preferably ensured that the printable composition P is at the set temperature; and the time to reach this temperature depends on the diameter of the storage enclosure 51 and of the nozzle 52.

Moreover, the additive manufacturing device 5 is provided advantageously with pressure sensor 56 (FIG. 2) installed in the storage enclosure 51, preferably at a lower (or downstream) section close to the connection with the nozzle 52, intended to interact advantageously with control means.

Such pressure sensor can provide information on the pressure drop within the nozzle 52. The pressure drop concerns the pressure difference in the composition between the entry of the nozzle 52 and the outlet, which is at atmospheric pressure.

The pressure difference can be used for two objectives.

A first objective is to determine the average change in viscosity of the preparation during its travel in the nozzle 52.

Such information can be useful to adjust eventually the temperature levels in the storage enclosure 51 and in the nozzle 52, to allow a high quality in terms of printability. An excess of viscosity may indeed yield a wrinkling of the gel at the exit of the nozzle 52.

A second objective is to adjust the velocity of the composition in the printing system.

An excess of overpressure in the nozzle 52 may yield wrinkling of the gel. An excess of overpressure in the nozzle 52 may also yield a well-known phenomenon named "die-swell"; in such case, the printed gel expands to a higher diameter than the internal diameter of the nozzle 52 at the exit of the nozzle 52. This should be accommodated in the supervision of the printing system in particular regarding the velocity of the motion of the nozzle 52 and the distance between the nozzle 52 and the object being printed in order to obtain a good quality of the printed object.

The additive manufacturing device 5 can also be provided with optical capture means (for example a miniaturized video camera—not shown) to measure the die-swell phenomena and to control it by action on the volume flow rate of the additive manufacturing device 5, advantageously via control means of the additive manufacturing device 5.

The obtained images are at follow analyzed by an automated procedure to quantify and determine the die-swell phenomenon and to act on the additive manufacturing device 5, notably at follow on the velocity of the printing system including volumic flow rate of the additive manufacturing device 5, distance between the nozzle 52 and the printed object, and motion parameters of the nozzle 52.

Generally, during said printing step, the additive manufacturing device 5 (in particular the storage enclosure 51 and the nozzle 52) and the surface S have a relative movement, combined with extrusion of material through the nozzle 52.

The consecutive deposition of layers is undertaken by directing the nozzle 52 at pre-determined locations by the 3D model to obtain the printed object T of interest.

The printable composition P is thus pushed through the nozzle 52, which is maintained at a higher temperature than the storage enclosure 51.

The printing temperature results in gelatinization of said non-gelatinized starch granules G, herein into the nozzle 52, and then in retrogradation of starch when deposited as a layer in the printed object T to form the three-dimensional network.

Further thermal treatments of the printed object can then be envisaged, such as additional baking of said printed object in order to stabilize the structure of the printed object and eventually to dry its surface to form a crust.

Of course, various other modifications can be made to the invention within the scope of the appended claims.

EXAMPLES

Production of the Modified Starch

A dry heating treatment (DHT) consisted in a thin layer (1 until 2 mm) of cassava starch (50 g) which was distributed over a sheet of aluminum foil and covered with another sheet of aluminum foil.

Such process can also be done by the deposition of the flour in a baking oven at a given temperature without coverage of the flour.

The lateral parts were closed with tape to form a closed envelope in order to avoid the loss of material.

The packed starch was then placed in a hot-air convective oven, in which DHT was performed using air at 100-130° C. around 4 h.

After processing, the starch was cooled and stored in glass containers for further analysis.

An ozone treatment was conducted using a reactor with starch suspended in distilled water (10 g dry starch/100 g suspension; 1500 mL) under constant stirring using a magnetic stirrer.

Ozone was produced in an ozone generator unit using the coronal-discharge method from industrial oxygen (95% purity).

The ozone-rich gas current was directed to a cylindrical glass reactor (2 L capacity, 56 cm high, and 6 cm internal diameter) via a glass tube ending in a porous gas disperser.

The gas flow in the reactor was maintained constant at 1.0 L min-1, and the ozone concentration in the gas current was kept at 43 mg O3 L-1.

The starch was processed for 30 min.

The gas flow leaving the reactor was directed to an ozone destructor, which thermally destroys the residual ozone in oxygen.

After the ozone treatment, the reactor was supplied with oxygen only for a further 10 min, in order to eliminate the residual ozone.

Production of the Starchy Hydrogel

A suspension of 10% starch (10 g starch dry basis/100 g) was prepared in an Erlenmeyer. The suspension was heated in a bath at 80° C. for 20 min.

The Erlenmeyer was covered with plastic film with a small opening to insert a spatula to promote agitation.

The gel was transferred to the syringe.

Production of the Blends Based on the Starchy Hydrogel and Non-Gelatinized Starch Granules A suspension of 10% starch (10 g starch dry basis/100 g) was prepared in an Erlenmeyer.

The suspension was heated in a bath at 70-80° C. for 20-30 min.

The Erlenmeyer was covered with plastic film with a small opening to insert a spatula to promote agitation.

The gel was removed and when it reaches room temperature, 5% starch (5 g starch dry basis/100 g) was added.

The gel with the granules was homogenized using a spatula, and then it was transferred to the syringe.

Table 1 shows the combination of starch content for each formulation to be printed.

TABLE 1

| Formulations | Printing matrix (g starch/100 g suspension) | Starch granules (g/100 g suspension) | | Final solution (g starch/100 g suspension) |
|---|---|---|---|---|
| 1* (FIG. 3A) | 10 | 0 | | 10 |
| 2* (FIG. 3B) | 15 | 0 | | 15 |
| 3 (FIG. 3C) | 10 | Native | 5 | 15 |
| 4 (FIG. 3D) | 10 | Modified (DHT) | 5 | 15 |
| 5 (FIG. 3E) | 10 | Modified (ozone) | 5 | 15 |

*formulations only to compare the effect of addiction of the starch granules.

Then the extrusion process is accompanied by heating (heating control). The material exits through the nozzle fitted to the syringe and it is deposited on the movable glass platform.

The velocity of extrusion, the direction (x and y) and the velocity of the glass platform, are controlled by a computer-controlled.

The temperatures of the heating zones were maintained (50° C. at the storage enclosure and 100° C. at the nozzle).

The dimensions of the nozzle were varied to understand the effect of the residence time in the printability of the inks. The diameter evaluated was 0.8 mm and the length 2.5 cm.

Figure 3:
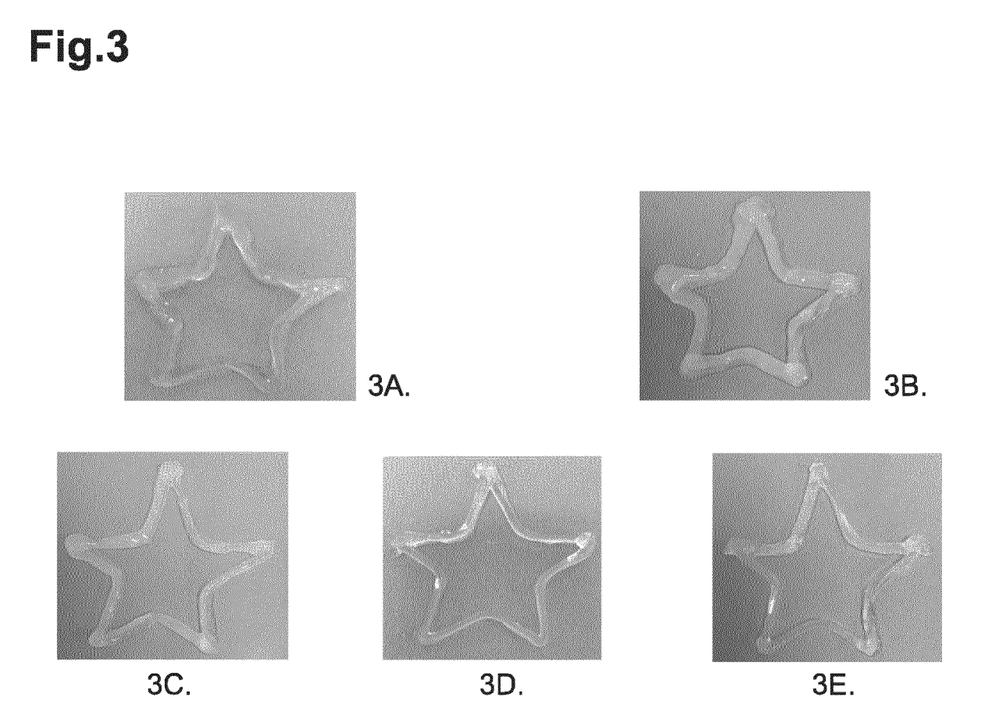
FIG. 3 shows images of "stars" shape printed samples, obtained by additive manufacturing of printable composition containing different forms of cassava starch.

As it can be seen in FIG. 3, the modified starch granules addition resulted in stars with better resolution than the other formulations (FIG. 3D and FIG. 3E). The formulations with the modified starch granules spread less on the printing surface, and made it possible to obtain thinner and more defined lines.

This invention is more advantageous than the present technology: modified non-gelatinized starch granules improve the printability of the inks based on starch than the native ones.

The invention claimed is:

1. Method of additive manufacturing by hot-extrusion, which method of additive manufacturing comprises the following successive steps:
 a providing step, wherein a printable composition is provided,
 said printable composition comprising an aqueous printing matrix, in which non-gelatinized starch granules are dispersed,
 wherein said non-gelatinized starch granules have a gelatinization temperature,
 a printing step, wherein said printable composition is subjected to heat treatment and is deposited layer by layer,
 wherein, during said printing step, said printable composition is subjected to a succession of two different heating temperatures:
 a storage heating temperature, lower than said gelatinization temperature, in order to heat said printable composition without gelatinizing said non-gelatinized starch granules, and
 a printing heating temperature, higher than said gelatinization temperature, in order to gelatinize said non-gelatinized starch granules in said layers.

2. The method of additive manufacturing, according to claim 1, wherein the storage heating temperature is ranging from 20° C. to 10° C. below said gelatinization temperature, and wherein the printing heating temperature is ranging from 20° C. to 50° C. above said gelatinization temperature.

3. The method of additive manufacturing, according to claim 1, wherein said method is implemented with an additive manufacturing device,
 which additive manufacturing device comprises:
 a storage enclosure, intended to contain said printable composition,
 a nozzle, and
 heating means,
 wherein said storage enclosure and said nozzle comprise separate heating means,
 and wherein said additive manufacturing device further comprises control means designed to control said heating means at different temperatures, with a temperature setpoint of said nozzle according to said printing heating temperature which is greater than a temperature setpoint of the storage enclosure according to said storage heating temperature.

4. The method of additive manufacturing, according to claim 1, wherein said non-gelatinized starch granules consist in non-gelatinized modified starch granules, obtained by modification of native starch granules,
 wherein the gelation capacity of said non-gelatinized modified starch granules is higher than the gelation capacity of said non-gelatinized native starch granules.

5. The method of additive manufacturing, according to claim 4, wherein said gelation capacity consists in the potential of a hydrocolloid issued from said non-gelatinized starch granules to organize themselves to form a three-dimensional structure, resulting in a stronger hydrogel, and
 wherein said gel firmness capacity of said non-gelatinized modified starch granules is at least 4 times higher than the gel firmness capacity of said non-gelatinized native starch granules.

6. The method of additive manufacturing, according to claim 4, wherein the non-gelatinized modified starch granules consist of non-gelatinized native starch granules modified by a dry heating treatment or by an ozone oxidation treatment.

7. The method of additive manufacturing, according to claim 1, wherein the non-gelatinized starch granules are chosen from the starch granules obtained from cassava.

8. The method of additive manufacturing, according to claim 1, wherein the printable composition comprises from 1 to 10% by weight of non-gelatinized starch granules.

9. The method of additive manufacturing, according to claim 1, wherein the aqueous printing matrix is chosen from hydrogels.

10. The method of additive manufacturing, according to claim 1, wherein the providing step comprises steps of manufacturing the printable composition, with:
 a manufacturing step, wherein said aqueous printing matrix is manufactured, and
 a dispersing step, wherein said non-gelatinized starch granules are dispersed within said aqueous printing matrix.

11. A printable composition for a method of additive manufacturing according to claim 1, comprising:
 an aqueous printing matrix, and
 non-gelatinized starch granules, dispersed or intended to be dispersed in said aqueous printing matrix,
 wherein said non-gelatinized starch granules consist in non-gelatinized modified starch granules, obtained by modification of native starch granules,
 wherein the gelation capacity of said non-gelatinized modified starch granules is higher than the gelation capacity of said native starch granules.

12. A method of additive manufacturing by hot-extrusion of a printable composition, the method comprising:
 providing said printable composition comprising an aqueous printing matrix in which non-gelatinized starch granules are dispersed,
 wherein said non-gelatinized starch granules consist in non-gelatinized modified starch granules, obtained by modification of native starch granules,
 wherein the gelation capacity of said non-gelatinized modified starch granules is higher than the gelation capacity of said native starch granules, and
 hot extruding the printable composition.

13. The method of additive manufacturing by hot-extrusion according to claim 1, wherein said non-gelatinized starch granules have a gelatinization temperature below 70° C.

14. The method of additive manufacturing according to claim 5, wherein said gelation capacity consists in gel firmness capacity.

15. The method of additive manufacturing according to claim 7, wherein the non-gelatinized starch granules are chosen from non-gelatinized modified cassava starch granules whereof the gelation capacity is higher than the gelation capacity of native cassava starch granules.

16. The method of additive manufacturing according to claim 9, wherein the aqueous printing matrix is chosen from starch hydrogels.

17. The method of additive manufacturing according to claim 16, wherein the aqueous printing matrix is chosen from thermoreversible hydrogels.

\* \* \* \* \*